June 18, 1935.  A. L. HARRIS ET AL  2,005,293

ROTARY DISPLAY APPARATUS

Filed June 7, 1933  5 Sheets-Sheet 2

Arthur L. Harris
Charles L. Harris, INVENTORS

BY Victor J. Evans & Co.

ATTORNEY

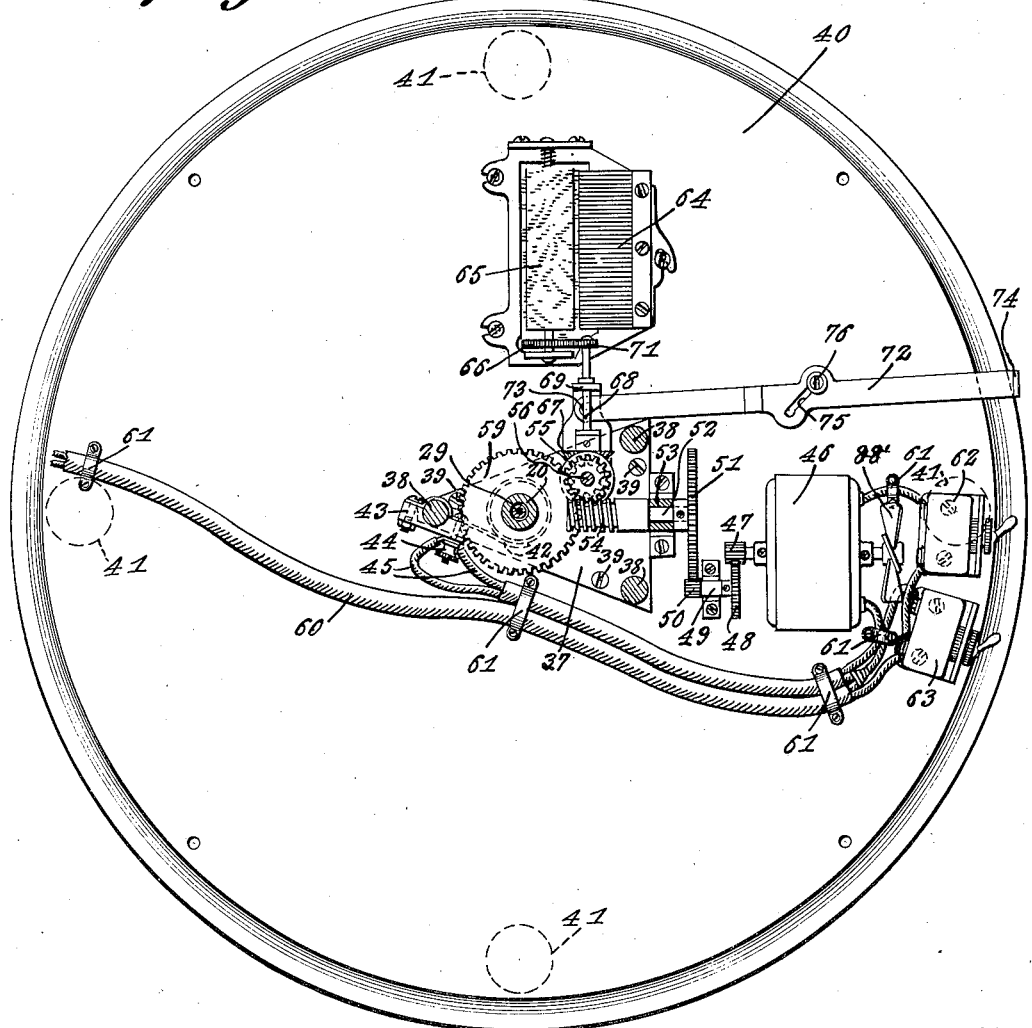

June 18, 1935.  A. L. HARRIS ET AL  2,005,293
ROTARY DISPLAY APPARATUS
Filed June 7, 1933  5 Sheets-Sheet 4
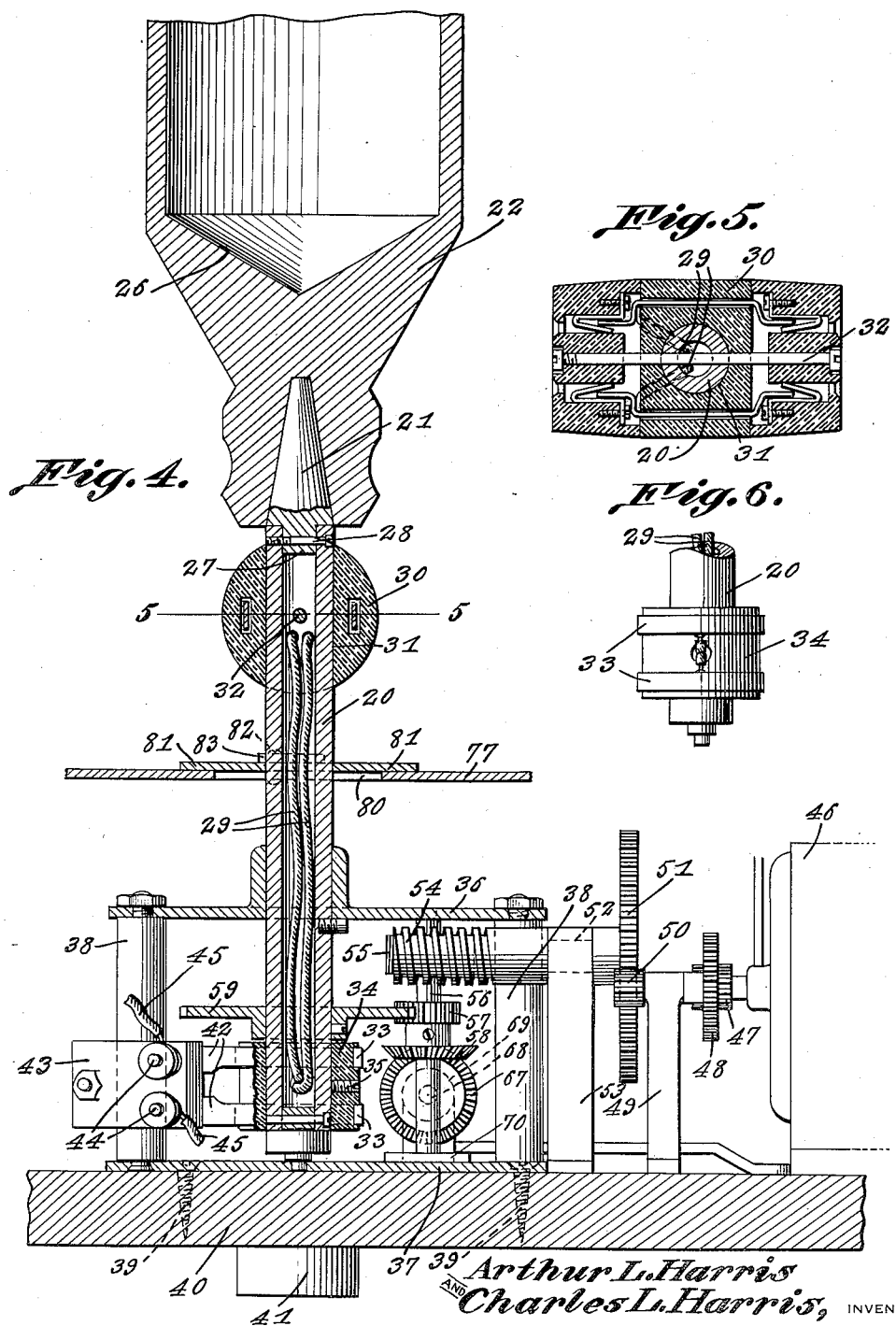
Arthur L. Harris
and Charles L. Harris, INVENTORS
BY Victor J. Evans & Co.
ATTORNEY June 18, 1935.  A. L. HARRIS ET AL  2,005,293
ROTARY DISPLAY APPARATUS
Filed June 7, 1933  5 Sheets-Sheet 5

Arthur L. Harris
and Charles L. Harris, INVENTORS
BY Victor J. Evans & Co.
ATTORNEY Patented June 18, 1935

2,005,293

UNITED STATES PATENT OFFICE 2,005,293

ROTARY DISPLAY APPARATUS

Arthur L. Harris and Charles L. Harris, New Albany, Ind., assignors to Louise M. Harris, New Albany, Ind.

Application June 7, 1933, Serial No. 674,736

2 Claims. (Cl. 248—45)

The object of the invention is to provide a rotary display apparatus adapted for holding Christmas trees and the like, so that the latter may not only be supported in an upright position but rotated or turned, so that all sides of the tree may be displayed and the operation of the trimming of the tree carried out from a fixed point, but periodically rotating it a specified angular distance during the trimming operation; to provide an apparatus of the kind indicated in which all the actuating mechanism is housed, so that there may be no danger presented to children or to others, as by coming in contact with electrical conducting wires or having the fingers or clothes caught in the gearing; to provide a display apparatus in which current for the illumination for the moving or rotating parts may be derived from the conductors feeding the actuating mechanism; and generally to provide a display apparatus which, for the functions to be carried out, is of comparatively simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 3 is a top plan view of the base with the cover or housing removed.

Figure 4 is an enlarged vertical diametrical sectional view through the rotary post and its associated parts and actuating mechanism.

Figure 5 is a sectional view on the plane indicated by the line 5—5 of Figure 4.

Figure 6 is a detail elevational view of the collector ring drum and associated collector rings.

Figure 9 is a perspective view of the pull bar designed to shift the gear mechanism illustrated in Figure 7.

Figure 10 is a top plan view of the structure of Figure 7.

Figure 1:
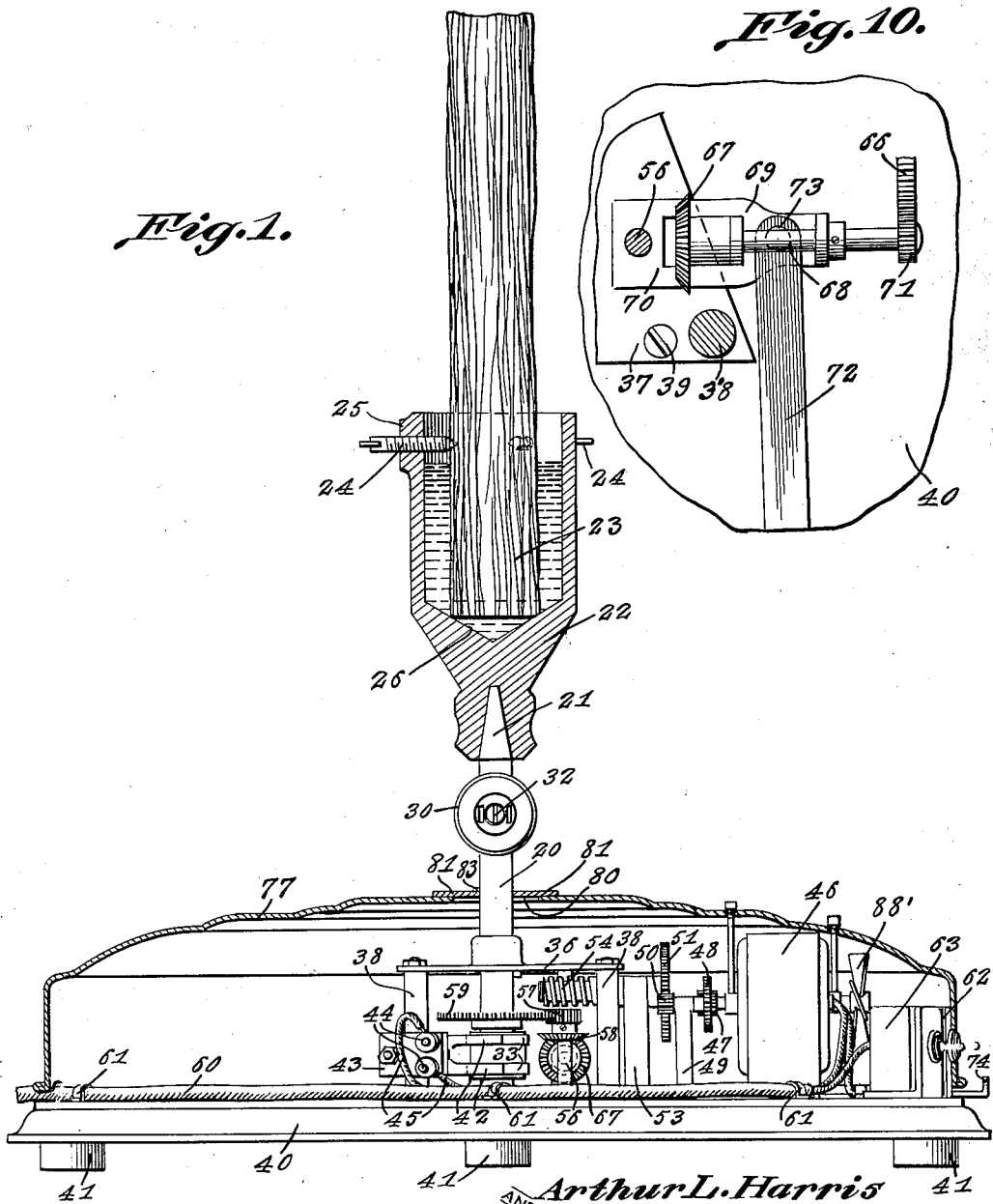
Figure 1 is a central vertical sectional view of the invention.
Figure 2:
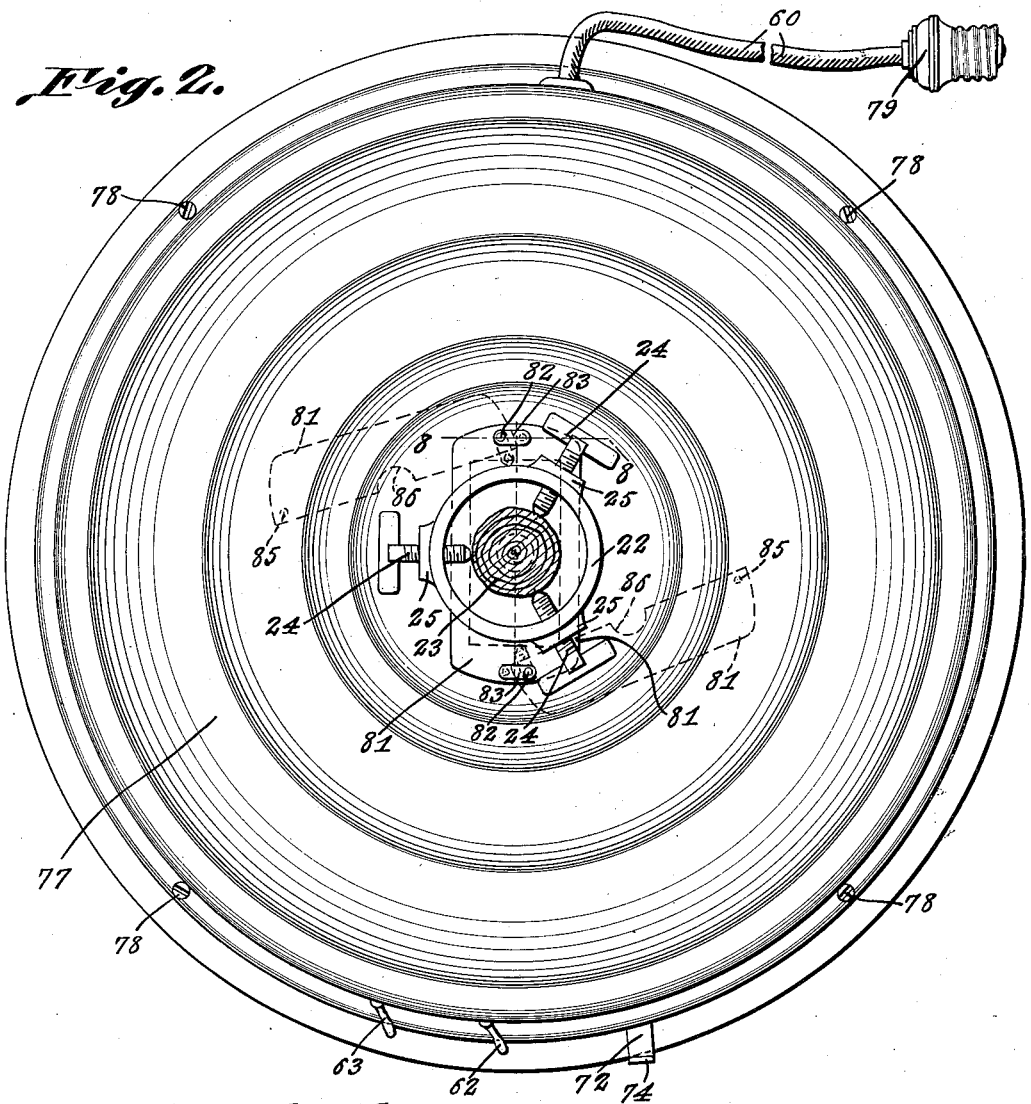
Figure 2 is a top plan view.
Figure 7:
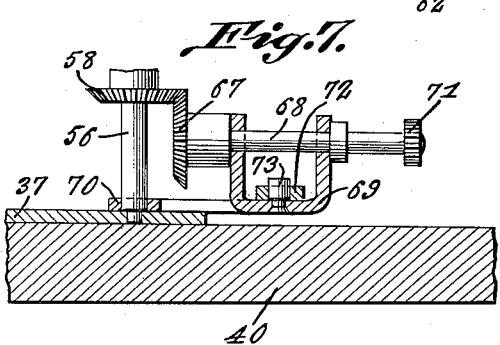
Figure 7 is a detail sectional view of the operative connections between the rotary post and a music box or other supplemental device with which the apparatus may be provided.
Figure 8:
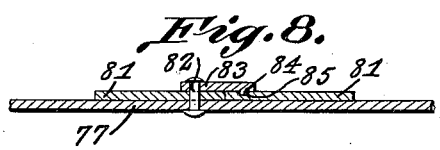
Figure 8 is a sectional view on the plane indicated by the line 8—8 of Figure 2.

The invention comprises a rotary post 20 on the tapered upper end 21 of which is seated a tree carrying socket 22, the lower end of the socket being entirely closed, so that the socket may act as a moisture receptacle to maintain in a fresh condition the tree which the socket carries by having the trunk 23 of the tree immersed in the contents of the socket which is of materially greater diameter than the tree trunk to provide space for the moistening fluid. The upright position of the tree trunk is maintained by clamping screws 24 threaded radially through the wall of the socket near the upper end and through thickened zones 25 of said wall. The socket is of tapering or conical form at the bottom, as shown at 26, which has a tendency to seat the trunk 23 axially central of the socket, so that the clamping screws may be adjusted to dispose the trunk in direct vertical position.

The tapered end 21 on which the socket is seated is removably secured to the body portion of the post, which is of tubular form, as clearly shown in Figure 4, the tapered portion of the post having a centrally disposed stud portion 27 entering the upper end of the post, so that the adjacent shoulder portion may seat directly on the upper end. The tapered portion 21 is secured in attached position to the post by a diametrical screw 28 passed through the post and through the stud portion 27. The post 20 is made of tubular form to provide means for housing the electrical conductors 29 which pass axially through it to reach a receptacle 30 which is formed with a diametrical bore 31 through which the post passes, the receptacle being secured in position on the post by means of a screw 32 which passes through the receptacle and through the post. The conductors feeding the receptacle terminate in collector rings 33 which are mounted on an insulating drum 34 secured, as by means of a set screw 35, to the post 20.

The post is rotatably mounted and to this end there is provided a mounting frame composed of the plates 36 and 37 separated by spacing posts 38 to which they are secured. The post 20 is journalled in centrally disposed bearings in these plates and the plate 37 is secured, as by means of screws 39, to a supporting base 40 which may be of any acceptable material but which is preferably of wood, because of the general insulating properties of the latter. The base 40 is mounted on feet 41 which are preferably of rubber, such material not only having insulating properties but also having a high coefficient of friction. Thus, any tendency to move the base laterally on its supporting surface is resisted by the frictional contact of the feet 41 with the same.

Since the post 20 is designed to be rotated, a sliding contact must be provided in the supply line feeding the receptacle 30. Therefore, the brushes 42 are provided bearing on the collector rings 33, these brushes being mounted in an insulating holder 43, secured to one of the spacer posts 38, and having a binding post 44 with which the conductors 45 may connect.

Rotary movement of the post 20 is derived from a motor 46 which may be of any acceptable design. Where alternating current is available, a brushless motor may be employed, either of the shaded field type or of the split phase type in which the phase splitting winding is maintained constantly in circuit. Such a motor will have only its bearings and journals as elements subject to wear and will thus have a very long life without the necessity for any attention. The motor 46 is operatively connected with the post 20 through a speed reduction gearing consisting of a pinion 47 mounted on the motor shaft and meshing with a gear 48 mounted on an idler shaft journalled in the bracket 49 disposed upon and carried by the base 40. Mounted on the same shaft with the gear 48 is a pinion 50 meshing with a spacer gear 51 mounted on a shaft 52 journalled in the bearing of a bracket 53, the shaft 52 carrying a worm 54 meshing with a worm gear 55 mounted on a vertical shaft 56 journalled in the plates 36 and 37. The shaft 56 carries a pinion 57 and a miter gear 58, the pinion 57 meshing with a gear 59 carried by the post 20. Obviously this construction provides for a comparatively slow angular speed of rotation for the post, despite the high rotary speed that the motor 46 will have.

Conductors 60 are provided for connecting the driving motor 46 and the receptacle 30 to an energizing source, these conductors being secured to the base 40 by appropriate clamps 61 and being connected in with the toggle switches 62 and 63, which are also supported on the base, so that the former will control the motor circuit and the latter the circuit of the receptacle 30.

The base, particularly where it is designed to support a tree, will be of comparatively great area and therefore other devices, as an enjoyment to the use of the invention, may be mounted on the base and actuated by the motor thereof. Such a device, for example, may be a music box, such as indicated at 64 of which the cylinder 65 is provided with a shaft to which a gear 66 is connected. An operative connection is effected between this gear and the driving motor by means of the miter gear 58 above referred to and a second miter gear 67 meshing with the first but having its axis of rotation arranged horizontally, thus disposing the shaft 68, by which it is carried, parallel to the base 40. The shaft 68 is journalled in the bracket 69 having an extension piece 70 formed with an eye through which the shaft 56 passes. This arrangement provides for swinging movement of the bracket with the shaft 56 as a center, so that the miter gears 58 and 67 will always be in mesh. In one position of the bracket 69, the pinion 71 with which the shaft 68 is provided will be in mesh with the gear 66 on the drum or cylinder 65 of the music box. In any other position, the pinion 71 will be withdrawn from in mesh with the gear 66.

The means for effecting swinging movement of the bracket 69 consists of a pull bar 72, having a pivotal connection 73 with the bracket and an upturned finger portion 74 at its remote end disposed adjacent the periphery of the base 40. At an intermediate point, the pull bar is provided with a diagonal slot 75 which, in any movement of the pull bar, is traversed by a screw stud 76, passing through the slot and secured in the base 40. Longitudinal movement of the pull bar in one direction will disengage the pinion 71 from the gear 66, re-engagement of the two being effected on opposite movement being imparted to the bar. When the motor 46 is rotating, therefore, the music box may be rendered operative or inoperative by the proper manipulation of the pull bar 72.

All of the apparatus carried by the base is completely enclosed by a housing or cover 77 secured to the base by fasteners, such as screws 78. The supply conductor 60 extends through the peripheral wall of the housing and terminates in an attachment plug 79 by means of which it may be connected in on an energizing source. The switches 63 and 62 and the pull bar 72 are also accessible from the exterior of the housing, but these parts are all the parts exposed with the exception of the projecting upper end of the post 20 which passes centrally through a clearance opening 80 with which the housing is formed in the top. The clearance opening provides access to the interior of the housing from the top when the cover plates 81 are swung to open position, these plates being of a size to close the opening and pivotally secured, as at 82, to the cover on diametrically opposite sides of the post 20. The pivot pins 82 which constitute the pivotal mounting for the cover plates also secure in place the clip plates 83 formed on the under faces of the bulges 84 seating in recesses 85 in the cover plates. In closing, the cover plates are moved into edge abutting relation when the recesses engage the bulges on the clip plates, but the post is free to rotate by reason of the clearance space provided in the cover plates by recessing them on their facing edges, as indicated at 86.

Figure 11:
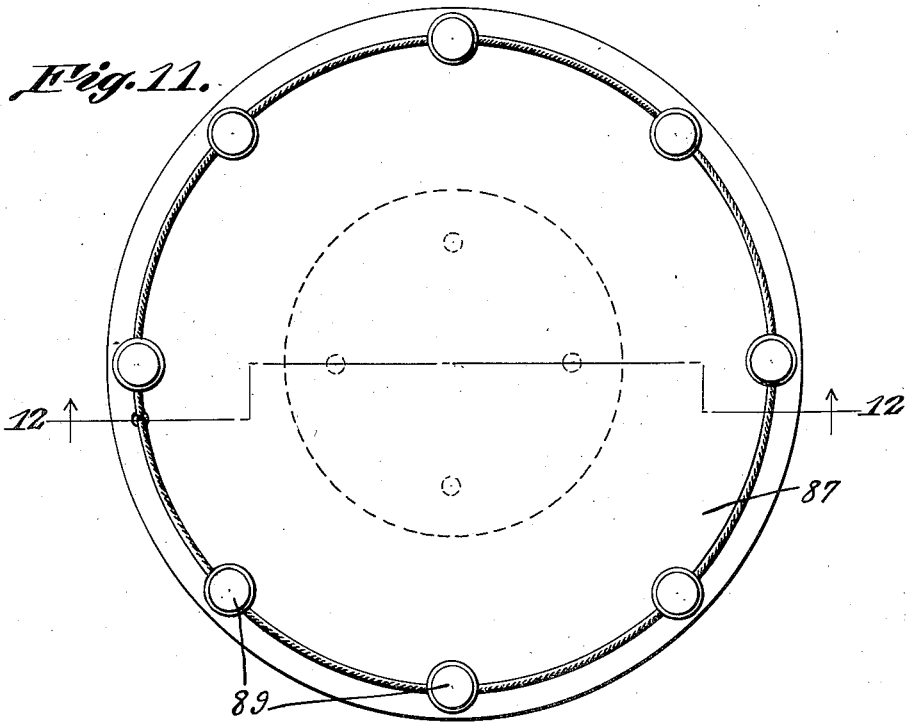
Figure 11 is a top plan view of a modified form of the invention showing the rotating means for a display table.
Figure 12:
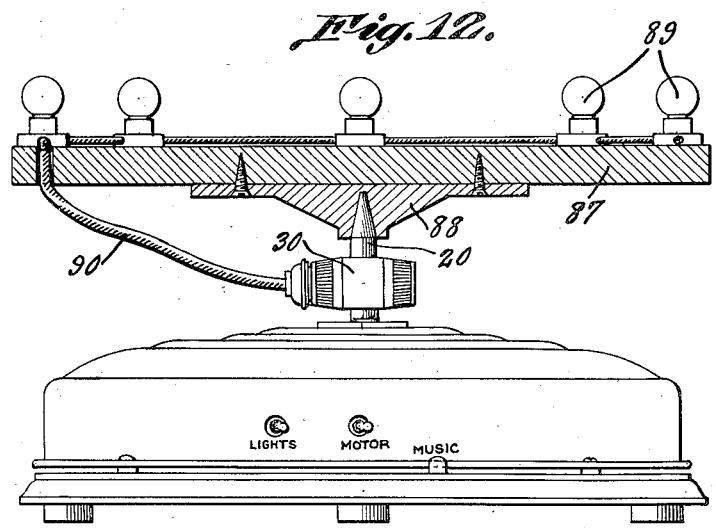
Figure 12 is a sectional view on the plane indicated by the line 12—12 of Figure 11.

In the modification of the invention shown in Figures 11 and 12, a table 87 is substituted for the socket 22, this table being secured to a plate 88 formed with an appropriate socket to seat on the upper tapered end of the post 20. The table on the top face is preferably bounded with a series of lights 89 which may be energized by plugging their feed conductor 90 into the receptacle 30.

The receptacle 30 is double-ended, so that plugs connected with conductors feeding lights on a table, such as the table 87, or lights strung in a Christmas tree, may be readily plugged into the same, when the tree lights or table lights will be energized upon the closing of the switch 63. The table or socket may then be put in motion by closing the switch 62, when the motor will be energized with the consequent rotation of the post 20. The music box may be selectively rendered operative or inoperative during the rotation of the post by the proper manipulation of the pull bar 72.

The motor 46 is provided with a fan 88' on the end remote from the pinion 47, this fan being for the purpose of driving away from the motor the hot air resulting from the heat generated by the rotation of the motor.

The invention having been described, what is claimed as new and useful is:

1. A display apparatus comprising a rotary post, a display carrying member mounted at the upper end of said post, a base in which said post is rotatably mounted for turning movement on a vertical axis, driving means for said post, a cover enclosing said driving means, and said post extending centrally through the top of said cover, an electrical receptacle carried by the post exterior to the cover, an insulating drum mounted on the post below the cover, collector rings peripherally mounted on the drum and having conductors extending axially through the post to the receptacle, and brushes bearing upon the collector rings and designed for connection to the opposite sides of an electrical energizing source.

2. Apparatus for the purpose indicated comprising a rotary post, a frame in which said post is journaled, a base on which said frame is mounted, a driving motor mounted on the base and operatively connected with the post to rotate the latter, collector rings mounted upon but insulated from the post and provided with brushes in superficial contact with them, and a receptacle formed with a diametrical bore through which the post passes, a screw passing axially through the receptacle and through the post, the post being formed with an axial bore, and conductors disposed in said bore and extending from the contacts in said receptacle to the collector rings respectively.

ARTHUR L. HARRIS.
CHARLES L. HARRIS.